(12) United States Patent
Claire et al.

(10) Patent No.: US 6,705,343 B2
(45) Date of Patent: Mar. 16, 2004

(54) PRESSURE REGULATOR WITH INTERNAL FILTER

(75) Inventors: Brian Claire, Andover, MN (US); Bruce Le Gare, Elk River, MN (US)

(73) Assignee: Tescorn Corporation, Elk River, MN (US)

(*) Notice: Subject to any disclaimer, the term of this patent is extended or adjusted under 35 U.S.C. 154(b) by 188 days.

(21) Appl. No.: 10/125,284

(22) Filed: Apr. 18, 2002

(65) Prior Publication Data

US 2003/0196701 A1 Oct. 23, 2003

(51) Int. Cl.$^7$ ............................................. G05D 16/04
(52) U.S. Cl. ..................... 137/505.41; 137/505; 137/544
(58) Field of Search ................................ 137/505, 505.39, 137/505.41, 505.42, 544

(56) References Cited

U.S. PATENT DOCUMENTS

| | | | |
|---|---|---|---|
| 2,069,808 A | * 2/1937 | Andersson | 137/505.41 |
| 3,357,162 A | * 12/1967 | Doig | 96/397 |
| 3,556,125 A | 1/1971 | Dowdall | |
| 5,078,167 A | * 1/1992 | Brandt et al. | 137/549 |
| 5,090,438 A | 2/1992 | Nimberger | |
| 5,904,178 A | 5/1999 | Bracey | |
| 5,998,204 A | * 12/1999 | Tsien et al. | 435/325 |

* cited by examiner

*Primary Examiner*—Stephen M. Hepperle
(74) *Attorney, Agent, or Firm*—Clayton R. Johnson

(57) ABSTRACT

The pressure regulator has a regulator body with a control chamber and outlet and inlet passageways opening thereto, a bonnet with a bonnet chamber and a diaphragm separating the chambers. A filter housing is mounted in the control chamber and mounts a filter and a valve seat that opens to the inlet passageway while spring urged mechanism moves the a valve stem to permit fluid flow through the valve seat and into the control chamber between the filter and diaphragm when the pressure therein falls below a preselected level, and then through the filter to the outlet passageway. When the pressure in the outlet passageway is at or above a preselected value, the pressure acts against a diaphragm whereby the piston retains the valve stem in a fluid flow blocking position.

15 Claims, 2 Drawing Sheets

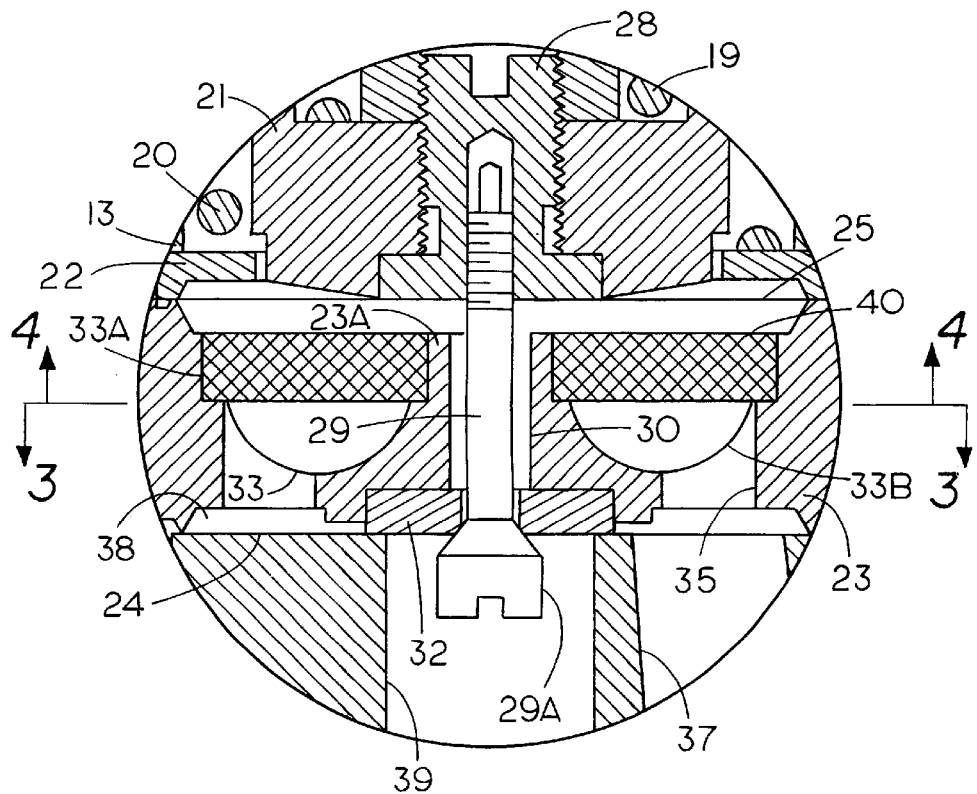
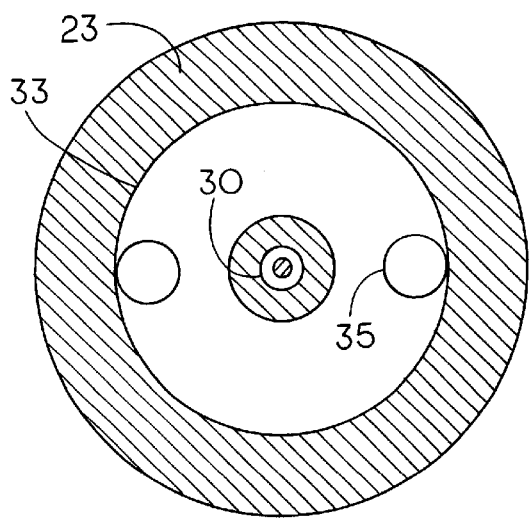
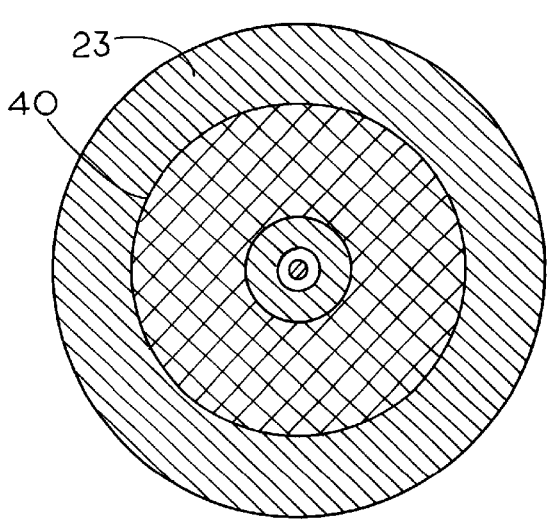

PRESSURE REGULATOR WITH INTERNAL FILTER

BACKGROUND OF THE INVENTION

This invention is for a pressure regulator that has a metal filter interposed in the regulator body between the regulator inlet and outlet.

U.S. Pat. No. 3,556,125 to Dowdall discloses a pressure regulator having a filter in the regulator housing to filter out dust in the fluid flowing from the inlet to the valve seat. A valve member is mounted to the diaphragm to extend through the valve seat and has an enlarged portion abuttable against the valve seat to block fluid flow therethrough until the pressure in the outlet falls below a preselected level.

In U.S. Pat. No. 5,090,438 to Nimberger there is disclosed a pressure regulator having a piston resiliently urged downwardly in the regulator body to resiliently retain a dart in engagement with a disc. The dart extends through an end portion of a nut that may be hex shaped. The disk is abuttable against the nut valve seat to block fluid flow from a high pressure inlet to the outlet. A filter assembly is threaded to the regulator body to have fluid flow from the regulator body inlet, then through the filter assembly and thence to the nut.

In order to make improvements in pressure regulator assemblies with filters, this invention has been made.

SUMMARY OF THE INVENTION

The pressure regulator assembly includes a regulator body having a control chamber, a bonnet having a bonnet chamber opening toward the control chamber and a flexible diaphragm separating the bonnet chamber from the control chamber. A spring assembly and a piston in the bonnet chamber resiliently urge the diaphragm to extend into the control chamber. A filter housing in the control chamber is mounted to extend between the diaphragm and bottom wall of the control chamber and mounts a valve seat to open to a central aperture of the housing, which in turn, opens to the diaphragm. A valve stem is mounted to the piston, extends through the central aperture and has an enlarged diametric portion abuttable against the valve seat to block fluid flow from the inlet passageway and through the valve seat to the central aperture. The housing has a recess opening to the diaphragm and in which there is mounted a filter. The regulator body has an inlet passageway opening through the bottom wall and the valve seat to the central aperture. The regulator body has an outlet passage opening through the bottom wall to have fluid that flows from the central aperture and through the filter to exit from the regulator body.

One of the objects of this invention is to provide new and novel means for mounting a filter in a pressure regulator. Another object of this invention is to provide for a pressure regulator, new and novel means for filtering fluid and the mounting thereof in order to reduce the space required for the filter means. Still another object of this invention is to provide new and novel means for mounting a filter to filter out undesirable material (particle contamination) in the fluid after it has flowed through a valve seat. In furtherance of the last mentioned object, it is an additional object of this invention to minimize turbulence of the flow through the pressure regulator.

BRIEF DESCRIPTION OF THE DRAWINGS

FIG. 2 is an enlarged fragmentary view showing the filter and adjacent parts of the regulator;

FIG. 3 is a transverse cross sectional view of the filter housing that is generally taken along the line and in the direction of the arrows 3—3 of FIG. 2; and FIG. 4 is a transverse cross sectional view of the filter housing that is generally taken along the line and in the direction of the arrows 4—4 of FIG. 2.

DESCRIPTION OF THE PREFEERRED EMBODIMENT

Figure 1:
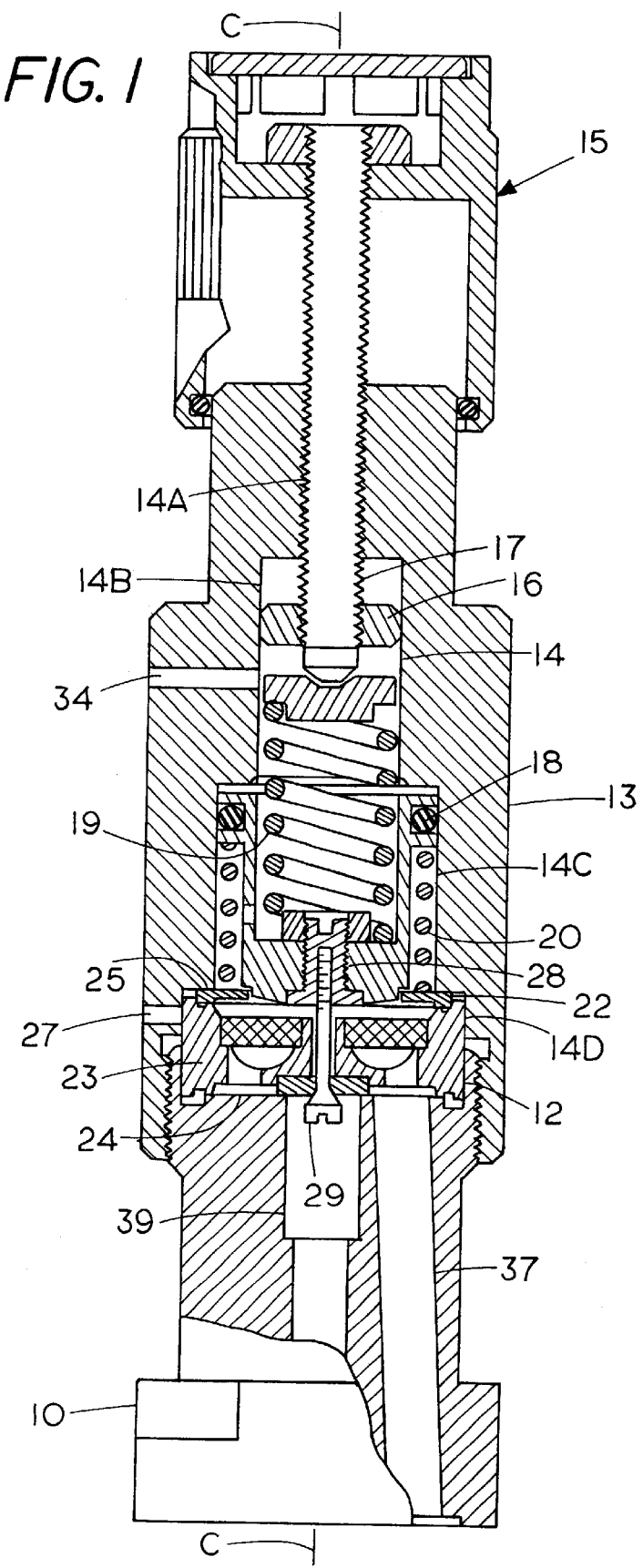
FIG. 1, other than for parts of the control knob and regulator body, is a cross sectional view of the pressure regulator of this invention that is shown in a view closed position.

Referring to the drawings, the pressure regulator of this invention, which is axially elongated and has a central axis C—C, includes a regulator body 10 having a control chamber 12 that opens through a transverse surface thereof. A bonnet 13 is threaded to the regulator body and has an axially elongated bore 14 forming a bonnet chamber that extend axially therethrough to open toward the control chamber.

A control knob 15 is mounted to an adjustment screw 17 which in turn is threadedly extending through the top reduced diameter portion 14A of the bore and into the intermediate diameter portion 14B of the bonnet bore. The lower end portion of the adjustment screw extends into the bore portion 14B to bear against the button 16 which in turn bears against one end of a load spring 19 for adjusting the compression of the load spring. The load spring extends into the bore of a piston 21 and abuts against the upwardly facing shoulder formed at the juncture of the enlarged and reduced diameter portions of the piston bore to constantly urge the piston toward the control chamber. The piston is located in the enlarged diameter portion 14C of the bonnet bore and has an enlarged diametric annular flange with a groove mounting an O-ring 18 to be in abutting engagement with the inner peripheral wall of the bonnet wall portion that defines bore portion 14C. The movement of the piston in a direction toward the control knob is limited by abutting against the annular shoulder defined by the intersection of bore portions 14B, 14C.

The end of bore portion 14C opposite bore portion 14B opens to a short, further enlarged bore portion 14D which in turn opens to the control chamber. One end of a balance spring 20 bears against the radial inner portion of a seal ring 22 while the opposite end of the balance spring bears against the piston flange to resiliently urge the piston in an axially upward direction (direction opposite the urging by the load spring). The radial outer portion of the ring seal seats against the annular shoulder formed by the junction of bore portions 14C, 14D while its radial inner portion is abuttable against an annular shoulder of the lower end portion of the piston to limit the downward movement of the piston.

Located in the control chamber to be removably clamped between the annular shoulder (bottom wall) 24 of the regulator body, which forms one end of the control chamber other than for a radial outer, annular depression and the radial outer portion of the seal ring opposite the portion that abuts against the bonnet is the radial outer portion of an annular filter housing 23 and the radial outer part of a diaphragm 25. The radial outer portion of the diaphragm is clamped between an annular ridge of the housing and the bonnet. By turning the adjustment screw to reduce the compression force on the load spring and unthreading the bonnet from the regulator body, the filter housing may be moved axially outwardly of the control chamber and replaced with another filter housing and filter. The filter housing and the seal ring together with the diaphragm separate the bonnet chamber from the control chamber while the axially opposite end of the housing has a radial outer ridge in fluid sealing relationship with the bottom wall 24. The bonnet has an aperture 27 opening to bore portion 14D for verifying the seal integrity between the filter housing, the regulator body and the bonnet wall portion that defines bore portion 14D. Further, the bonnet has a vent aperture that opens to bore portion 14B.

A stud 28 is threaded into the radial central portion of the piston which in turn has an axial valve stem 29 which is threadedly extended thereinto and extends through the transverse diaphragm. The stud abuts against the diaphragm axially opposite the filter housing. The valve stem extends through a central axial aperture 30 in the central portion 23A of the filter housing and a valve seat 32 in the enlarged diametric portion of the aperture, which is axially opposite the diaphragm. The valve stem has an enlarged diametric portion 29A seatable against the valve seat to block fluid flow therethrough.

The filter housing has an annular, generally semi-torus shaped recess 33 that opens toward the diaphragm and surrounds the housing radial central portion 33A through which the central aperture 30 extends, and outlet apertures 35 that open to the recess and through an annular chamber 38 to the outlet port (passageway) 37 in the regulator body. Even when the piston is in its lowermost position, the housing central portion 33A is still vertically spaced from the diaphragm. The annular chamber 38 opens to bottom wall 24 while the valve seat is in fluid sealing relationship to the bottom wall 24. The regulator body also has an inlet port (passageway) 39 that opens to the valve seat. The inlet and outlet ports (passageways) open through the bottom wall 24 to the control chamber and at least initially extend axially downwardly away from the bottom wall.

An annular sintered metal filter 40 is mounted in the generally cylindrical portion 33A of the annular recess 33 such that the fluid flowing from the inlet port 39, through the central aperture 30 and into the annular space between the filter and the diaphragm, thence through the filter to the annular space 38 and therethrough to the outlet port 37. The transverse surface area of the filter which is vertically adjacent to the diaphragm is many times greater than the transverse area of each of the openings of the outlet and inlet passageways through the bottom wall as is the bottom transverse surface of the filter which opens to the lower portion 33B of the housing recess 33. The filter is further vertically spaced from the diaphragm than the housing central portion 23A while the bottom transverse surface of the filter is at a higher elevation than the valve seat and the bottom wall 24.

When the pressure in the space between the filter and the diaphragm falls below a preselected pressure, the spring 19 moves the piston downwardly toward the filter and accordingly, the diametric portion 29A away from the valve seat. Thence pressurized fluid in the inlet port flows through the valve seat and the central aperture 30 to flow radially outwardly in all directions radially between the diaphragm and the filter and thence downwardly to flow through the filter. The filtered fluid passes through apertures 35, annular space 38 and to the outlet port. Upon the pressure building up in the space between the filter and the diaphragm to the preselected level, the combination of pressurized fluid in the control chamber together with the action of balance spring 20 moves the piston away from the valve seat until the enlarged diametric portion 29A abuts against the valve seat to block fluid flow therethrough.

What is claimed is:

1. A pressure regulator assembly comprising a regulator body having a control chamber that in part is defined by a bottom wall and outlet and inlet passageways opening through the bottom wall to the control chamber in spaced relationship to one another, a bonnet mounted to the regulator body and having a bonnet chamber opening toward the control chamber, diaphragm means for separating the control chamber from the bonnet chamber, control means extending within the bonnet chamber for resiliently urging the diaphragm toward the control chamber bottom wall, a filter housing in the control chamber and having a central aperture opening to the diaphragm means and an opening that opens to the other passageway, a valve seat mounted to the filter housing and opening to one of the passageways and to the central aperture, a valve stem mounted to the control means and extended through the diaphragm means and the housing central aperture for abutting against the valve seat to block fluid flow from the one passageway to the central aperture until fluid pressure between the filter housing and diaphragm falls below a preselected level and then moving to an open position, the filter housing having a recess opening to the other passageway and to the diaphragm means, and filter means mounted in the recess for filtering fluid flowing from the central aperture to the other passageway.

2. The pressure regulator assembly of claim 1 wherein the housing recess is annular and surrounds the central aperture in radially spaced relationship thereto and the filter is annular and in surrounding relationship to the central aperture.

3. The pressure regulator assembly of claim 1 wherein the one passageway is the outlet passageway and the other passageway is the inlet passageway.

4. The pressure regulator assembly of claim 1 wherein the filter housing mounts the valve seat in abutting relationship to the bottom wall.

5. The pressure regulator assembly of claim 4 wherein the housing recess is of a generally torus shape opening toward the diaphragm means and in radial spaced relationship to the central aperture.

6. The pressure regulator of claim 1 wherein the valve seat is mounted in abutting relationship to the bottom wall and that the housing in conjunction with the valve seat forms an annular space opening to the other passageway and the housing has an aperture for placing the recess in fluid communication with said annular space.

7. The pressure regulator assembly of claim 6 wherein the inlet and outlet passageways at least initially extend axially away from the bottom wall and the filter housing has a radial center portion having the central aperture extending axially therethrough and the filter means is further axially spaced from the diaphragm than the center portion.

8. The pressure regulator assembly of claim 7 wherein the control means includes a piston abutting against the diaphragm and movable in the bonnet chamber toward and away from the control chamber, spring means for urging the piston toward the control chamber and adjustable means mounted to the bonnet and acting against the spring means to selectively vary the compression of the spring means and thereby the force acting through the piston against the diaphragm.

9. A pressure regulator assembly comprising a regulator body having a control chamber that has a bottom wall and low pressure outlet and high pressure inlet passageways opening through the bottom wall to the control chamber in spaced relationship to one another, a bonnet mounted to the regulator body and having a bonnet chamber opening toward the control chamber, diaphragm means mounted by the bonnet and regulator body for separating the control chamber from the bonnet chamber, the diaphragm means including a diaphragm, control means extending within the bonnet chamber for resiliently urging the diaphragm toward the control chamber, a valve seat in the control chamber for having fluid flow from the inlet passageway and therethrough into the control chamber, valve means mounted to the control means and extending through the valve seat for movement between a closed position abutting against the valve seat to block fluid flow from the inlet passageway and through the valve seat and a position permitting fluid flow from the inlet passageway and through the valve seat, and filter means disposed in the control chamber in fluid communication with the valve seat and the outlet passageway for having fluid flow therethrough from the valve seat to the outlet passageway and filtering fluid flowing through the valve seat to the outlet passageway.

10. The pressure regulator assembly of claim 9 wherein the filter means comprises a filter housing mounted in the control chamber and having a central portion that has a central aperture opening toward the diaphragm in spaced relationship thereto and to the valve seat and a recess surrounding the central portion and opening toward the diaphragm to have fluid flow from the central aperture to the recess, the housing recess opening to the outlet passageway and an annular filter mounted in the housing recess for filtering fluid flowing from the central aperture to the outlet passageway.

11. The pressure regulator assembly of claim 10 wherein the bonnet is threadedly connected to the regulator body and the filter housing is removable from the control chamber by unthreading the bonnet from the regulator body.

12. The pressure regulator assembly of claim 10 wherein central portion extends more closely adjacent to the diaphragm than the filter and the valve seat is located more remote from the diaphragm than the filter.

13. The pressure regulator assembly of claim 12 wherein the filter housing has a radial outer peripheral portion more remote from the bottom wall than the central portion and the diaphragm means includes a seal ring abutting against the bonnet and clamping the diaphragm against the housing outer peripheral portion.

14. The pressure regulator assembly of claim 13 wherein the valve means includes a valve stem movably extending through the diaphragm and central aperture and having an enlarged diametric portion abuttable against the valve seat opposite the diaphragm for blocking fluid flow from the inlet passageway and through the valve seat to the central aperture.

15. The pressure regulator assembly of claim 14 wherein the control means includes a piston mounted in the bonnet chamber and having the valve stem connected thereto to move therewith, balancing spring means acting against the piston for urging the piston to move away from the bottom wall and therethrough move the valve stem to its closed position, load spring means for resiliently urging the piston toward the bottom wall and adjustable means mounted to the bonnet and extending within the bonnet chamber for selectively varying the compression of the load spring.

* * * * *